Feb. 11, 1964   W. W. WOODBURY   3,120,771
CONTAINER OPENING AND CLOSING FIXTURES
Filed Aug. 8, 1960   2 Sheets-Sheet 1

WILLIAM W. WOODBURY
*INVENTOR.*

BY
William W. Woodbury

Feb. 11, 1964  W. W. WOODBURY  3,120,771
CONTAINER OPENING AND CLOSING FIXTURES
Filed Aug. 8, 1960  2 Sheets—Sheet 2

*INVENTOR.*

*BY*

United States Patent Office 3,120,771
Patented Feb. 11, 1964

3,120,771
CONTAINER OPENING AND CLOSING FIXTURES
William W. Woodbury, Palo Alto, Calif.
(1121 Stanyan St., San Francisco, Calif.)
Filed Aug. 8, 1960, Ser. No. 48,207
6 Claims. (Cl. 81—3.4)

This invention relates in general to devices or tools for placing closures on and removing closures from containers and in particular to a tool or fixture which may be used to remove nearly all types and sizes of screw, pressed-on, crimped-on, and flanged pressed-in caps from containers of the kinds common in the grocery, beverage, and household supplies trades, and which alternatively may be used to tighten screw caps or to seal or to reseal containers of the kind commonly used for carbonated beverages and having crimped-on or crown caps.

Means for opening and closing most containers of the above specified types are well known. Their disadvantages are various, among which are: the need to select the appropriate one from several for each use and subsequently returning it to storage, the increment to chaos in the place where miscellaneous kitchen tools are kept, the awkwardness inherent in supplying manually both the action and the reaction needed for opening a container, the soiling of nearby surfaces consequent to the tilting of the container in using a wall-mounted cap remover, et cetera. There is no tool whatever to help with the rare but difficult case of the slipped-on cap, defined here to mean caps having no special overhang or bead to assist in removal.

In accordance with the present invention an unarticulated but possibly composite piece of material is so formed or carved and finished as to be a container opening, closing, or sealing device for those types of containers defined in the first paragraph. To be useful this tool must for wide-mouthed and actually does for all of the specified types permit opening while the container is held in a nearly upright attitude. Inherently the device assumes a form suitable for attaching to or making a part of the underside of a horizontal surface, a circumstance commonly available in the vicinity where such a device would be used.

An object of the present invention, therefore, is to provide in a single unarticulated tool means together with appropriate manual action will remove closures from the class of containers defined in the first paragraph.

Another object of the present invention is to provide in said tool means which together with appropriate manual action will tighten screw caps or reseal those containers which take crown caps, these latter being the only containers of the class commonly requiring both resealing and a tool for its accomplishment.

Another object of the present invention is to take advantage of a common kitchen arrangement and provide the tool in such form that it can be mounted as a fixture, out of the way yet ready for use, on under-cupboard or under-shelf space in the vicinity of most frequent need and in which attitude the fixture may be used to open containers while the containers are held in an approximately upright position thus decreasing the likelihood of spill.

Other objects of the invention will be pointed out in the following description and claims and illustrated in the accompanying drawings, which disclose, by way of example, the principle of the invention and the best mode which has been contemplated of applying that principle.

Figure 1:
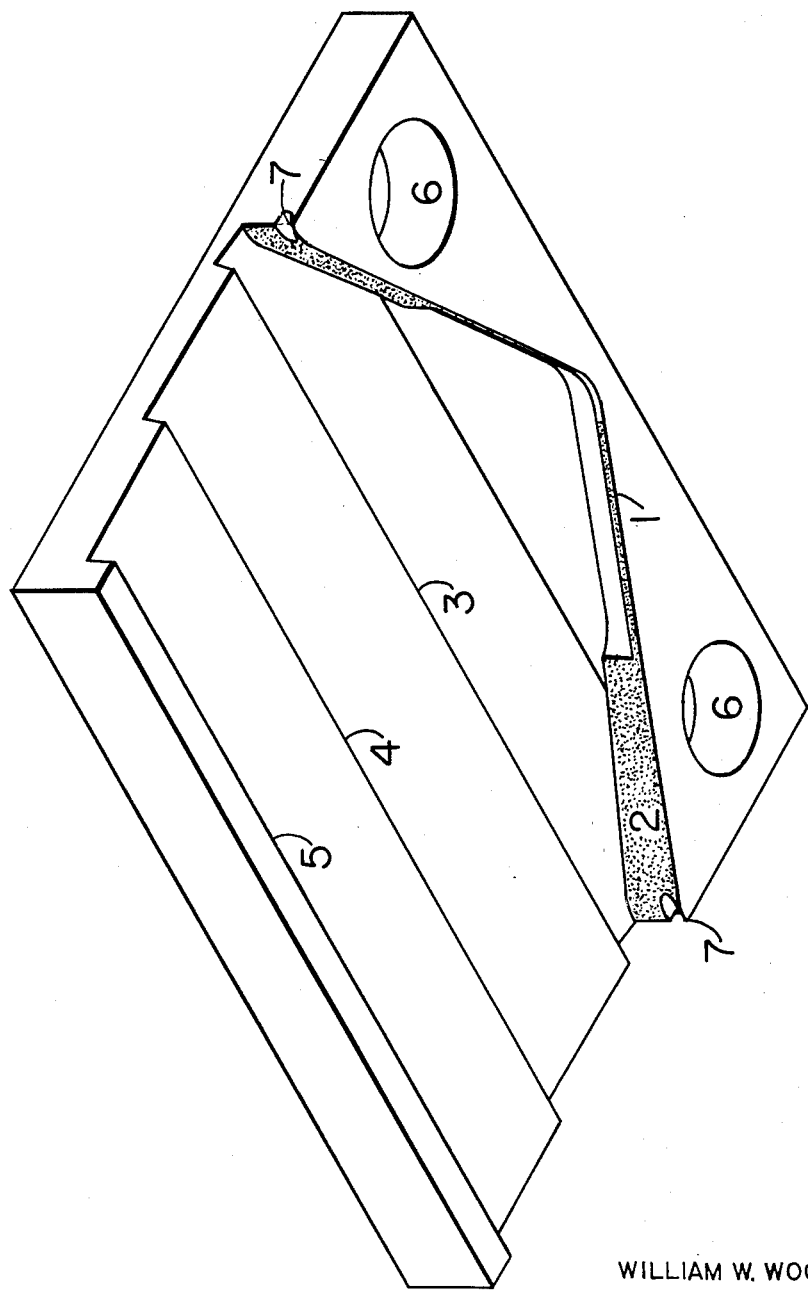
FIG. 1 is an isometric view of the fixture as seen from below, the fixture being in the horizontal plane as it would be mounted for use.

Referring to the drawings, the container uncapping and capping fixture includes a body 10 with a top surface 11; a ledge 1 suitably proportioned to engage the overhang or bead on pressed-on or crown caps; friction surfaces 2 for binding against the surfaces of screw caps and slipped-on caps; smooth faces 3, 4, and 5 against which, according to size, screw caps and slipped-on caps react when, with torsion applied in the appropriate sense, the cap is brought to engagement between one of the smooth faces and a friction face; circular recesses 6, one slightly larger than the other, the larger being used to initiate flexing of the rim of a new crown cap, the smaller to complete the sealing of containers with new crown caps or to reseal containers with used crown caps; and edges 7 to pry out flanged pressed-in caps. The body includes a stair step bottom surface 12 located between the friction surfaces 2 and the smooth faces 3, 4, and 5.

The mode of utilization of ledge 1, recesses 6, and edges 7 requires no further elaboration. The use of friction faces 2 together with smooth faces 3, 4, and 5 needs some explanation.

As can be seen in FIG. 1, the friction faces 2 are symmetrical to each other and extend from near the center on the face of ledge 1 to the sides of the fixture. The smooth faces, 3, 4, and 5, toward which the friction faces converge, are so arranged that a screw cap of the common sort, not smaller in diameter than the gap between faces 2 and 3 at the edges of the fixture nor too large in diameter to enter the triangle formed by the symmetrical friction faces with face 5, may be pressed against one or another of the three smooth faces and at the same time against either the right or the left friction face. With the cap so engaged, manual twisting of the container in one sense or the other together with the necessary forces to maintain the cap in the position of engagement will tend, in so far as the cap is tight to the container, to bind the cap against the friction face in such a fashion that the container may be turned into or out of the cap. This binding or grasping action is in the sense of loosening or tightening a cap having the customary right hand thread according to whether the engagement is with the left or right friction face, the fixture being viewed as illustrated.

It will be appreciated from the laws of physics having to do with frictional forces and static equilibrium that the grip will be secure against torsion having the sense which would roll the cap along the rough face toward the vertex of the angle included between the engaging rough and smooth faces provided that the difference between the angles (coefficients) of friction of the rough and smooth faces with respect to the material of the cap exceeds the included angle between the engaging faces.

Figure 2:
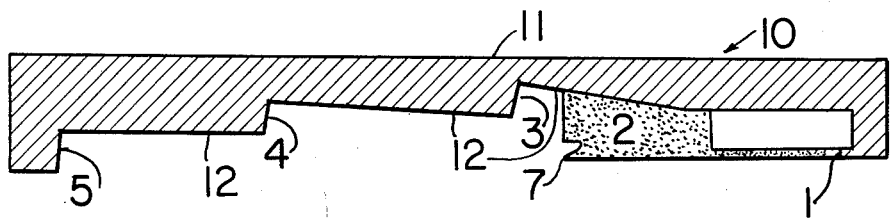
FIG. 2 is a section taken along the plane of symmetry of the fixture.
Figure 3:
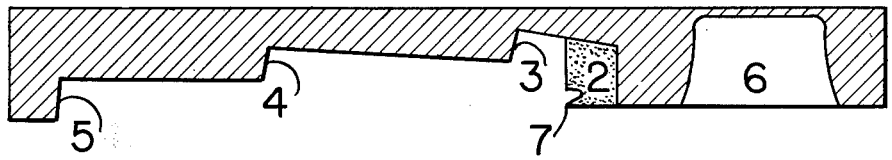
FIG. 3 is a section taken along a plane parallel to the plane of symmetry and passing through the center of one of the circular recesses.

Referring to FIGS. 2 and 3 it will be seen that the smooth faces 3, 4, and 5 are at an angle to the rough faces in section as well as in plan. This arrangement is made to provide torsion reaction about axes parallel to a diameter of a cap by means of the differential friction phenomenon just described. A pressed-on or slipped-on cap lacking the overhang necessary to be held by ledge 1 may be engaged along its upper margin between one of the smooth faces and a friction face in the same fashion as a screw cap. From this location, by partially withdrawing the cap from the fixture along the side engaged by the smooth face and moving the container and cap laterally, a new place of engagement may be found closer to the edge of the fixture. In this location with the cap engaged to the same depth as a screw cap by the rough face but only slightly engaged along the smooth face, forces on the container which tend to press the cap into the fixture along the smooth face while tending to withdraw the cap along the rough face will bind the cap and permit the container to be withdrawn some from the cap along that edge which is in the neighborhood of contact with the rough face. This same withdrawing action may be carried out with the container and cap rotated to various positions in which way lifting forces may be applied at various places about the periphery of the cap until it is removed, in position readily to be withdrawn by hand, or ruined.

While there have been shown and described and pointed out the fundamental features of the invention as applied to the preferred embodiment, it will be understood that various omissions and substitutions and changes in the form and details of the device illustrated may be made by those skilled in the art without departing from the spirit of the invention. It is the intention, therefore, to be limited only as indicated by the scope of the following claims.

What is claimed is:

1. A tool for manipulating caps on containers, the tool comprising a body, means on the body defining a first surface extending away from the body, means on the body defining a set of separate surfaces opposing the first surface, each of the surfaces in the said set being spaced a different distance from the first surface, each of the surfaces in the said set converging toward the first surface along the surface of the body and diverging away from the first surface in a direction away from the body, the first surface being rougher than the other surfaces.

2. A tool for manipulating caps on containers, the tool comprising a body, means on the body defining a first surface extending away from the body, means on the body defining a set of separate surfaces opposing the first surface, each of the surfaces in the said set being spaced a different distance from the first surface and increasing in extent away from the body with increased distance from the first surface, each of the surfaces in the said set converging toward the first surface along the surface of the body and diverging away from the first surface in a direction away from the body, the first surface being rougher than the other surfaces.

3. A tool for manipulating caps on containers, the tool comprising a body, means on the body defining a first surface extending away from the body, means on the body defining a set of separate surfaces opposing the first surface, the first surface being rougher than the other surfaces, each of the surfaces in the said set being spaced a different distance from the first surface and increasing in extent away from the body with increased distance from the first surface, each of the surfaces in the said set converging toward the first surface along the surface of the body and diverging away from the first surface in a direction away from the body, the angle of divergence of each surface in the set from the first surface decreasing with distance from the first surface.

4. A tool for manipulating caps on containers, the tool comprising a body, means on the body defining a bottom surface, means on the body defining a first upstanding surface extending away from the bottom surface, means on the body defining a second upstanding surface extending away from the bottom surface and spaced from and opposing the first upstanding surface, one of the surfaces being rougher than the other, the two upstanding surfaces diverging in a first direction away from the body, and converging in a second direction transverse to the first direction, the rougher surface being at least as close to the bottom surface as is the smoother surface.

5. A tool according to claim 4 in which one of the faces is in the form of a V.

6. A tool according to claim 4 in which one of the faces is in the form of a V opening toward the other face.

References Cited in the file of this patent

UNITED STATES PATENTS

| | | |
|---|---|---|
| 1,954,422 | McIntyre | Apr. 10, 1934 |
| 2,031,420 | Libherz | Feb. 18, 1936 |
| 2,053,246 | Lurcott | Sept. 1, 1936 |
| 2,810,311 | Smith | Oct. 22, 1957 |
| 2,929,283 | Cassidy | Mar. 22, 1960 |